United States Patent
Kamiya

(10) Patent No.: US 9,151,305 B2
(45) Date of Patent: Oct. 6, 2015

(54) LEVER CONNECTOR

(71) Applicant: YAZAKI CORPORATION, Tokyo (JP)

(72) Inventor: Jun Kamiya, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/378,883

(22) PCT Filed: Feb. 20, 2013

(86) PCT No.: PCT/JP2013/054191
§ 371 (c)(1),
(2) Date: Aug. 14, 2014

(87) PCT Pub. No.: WO2013/125584
PCT Pub. Date: Aug. 29, 2013

(65) Prior Publication Data
US 2015/0016876 A1   Jan. 15, 2015

(30) Foreign Application Priority Data
Feb. 20, 2012  (JP) .................. 2012-034173

(51) Int. Cl.
*F16B 3/00*   (2006.01)
*H01R 13/629*   (2006.01)
(52) U.S. Cl.
CPC ............ *F16B 3/00* (2013.01); *H01R 13/62938* (2013.01); *Y10T 403/595* (2013.01)
(58) Field of Classification Search
CPC ................... H01R 13/62933; H01R 13/62988; H01R 13/62955
USPC ...................... 403/321, 322.4, 353, 349, 350; 439/152, 153, 157, 159, 160
See application file for complete search history.

(56) References Cited

U.S. PATENT DOCUMENTS 5,171,156 A * 12/1992 Nagasaka et al. ............. 439/157
5,205,752 A *  4/1993 Taguchi et al. ............... 439/157
(Continued)

FOREIGN PATENT DOCUMENTS

| JP | 2002-298977 A | 10/2002 |
| JP | 3442661 B2 | 9/2003 |

(Continued)

OTHER PUBLICATIONS

The English translation of the Written Opinion of the International Search Report for PCT/JP2013/054191 dated May 21, 2013.

(Continued)

*Primary Examiner* — Daniel Wiley
(74) *Attorney, Agent, or Firm* — Kenealy Vaidya LLP

(57) ABSTRACT

Lever bodies (31) include first shaft introducing grooves (34) which introduce lever supporting shafts (11) of a first connector housing (10) to first initial engaged positions P1, second shaft introducing grooves (35) which introduce action receiving shafts (23) of a second connector housing (20) to second initial engaged positions P2, first communicating grooves (37) which introduce the lever supporting shafts (11) to pivoting fulcrum parts (36), second communicating grooves (39) which introduce the action receiving shafts (23) to action receiving parts (38), and shaft detaching grooves (40, 41) which make the lever supporting shafts (11) and the action receiving shafts (23) escape to the outside of the lever bodies (31) along detachment moving traces which are different from those at the time of installing.

6 Claims, 10 Drawing Sheets

(56) References Cited

U.S. PATENT DOCUMENTS

| | | | |
|---|---|---|---|
| 5,445,530 A * | 8/1995 | Inoue et al. | 439/157 |
| 5,499,926 A * | 3/1996 | Akeda | 439/157 |
| 5,551,885 A * | 9/1996 | Yamanashi et al. | 439/157 |
| 6,254,409 B1 | 7/2001 | Okabe et al. | |
| 6,638,085 B1 * | 10/2003 | Martin | 439/157 |
| 7,384,286 B2 * | 6/2008 | Imai et al. | 439/157 |
| 7,442,058 B2 * | 10/2008 | Ohtaka et al. | 439/157 |
| 7,578,685 B2 * | 8/2009 | Matsumura et al. | 439/157 |
| 8,419,462 B2 * | 4/2013 | Tanaka et al. | 439/372 |
| 2002/0142479 A1 | 10/2002 | Okabe et al. | |
| 2005/0098419 A1 * | 5/2005 | Matsui et al. | 200/311 |
| 2006/0096848 A1 | 5/2006 | Sakatani et al. | |
| 2006/0240693 A1 * | 10/2006 | Nishide | 439/157 |
| 2006/0281351 A1 * | 12/2006 | Yamaoka | 439/157 |
| 2009/0023316 A1 * | 1/2009 | Takahashi et al. | 439/157 |
| 2012/0297613 A1 | 11/2012 | Shinkawa et al. | |
| 2015/0017825 A1 * | 1/2015 | Kamiya | 439/153 |

FOREIGN PATENT DOCUMENTS

| | | |
|---|---|---|
| JP | 2006-156340 A | 6/2006 |
| JP | 2011-150934 A | 8/2011 |

OTHER PUBLICATIONS

International Search Report and Written Opinion of the International Search Report for PCT/JP2013/054191 dated May 21, 2013.

* cited by examiner

LEVER CONNECTOR

TECHNICAL FIELD

The present invention relates to a lever connector.

BACKGROUND ART

FIG. 17 shows an example of traditional lever connectors.

This lever connector 100 which is disclosed in a PTL1 below includes a first connector housing 110, a second connector housing 120 which is fitted and connected with the first connector housing 110, and a fitting lever 130 which is pivotably installed to the first connector housing 110.

The second connector housing 120 has an outer sheath wall part (hood part) 121 into which the first connector housing 110 is inserted.

The fitting lever 130 is a member by which an operating force to fit/detach the first connector housing 110 into/from the second connector housing 120 can be reduced, and is pivotably installed to shafts 111 which are protruded from the outside surfaces of the first connector housing 110.

As shown in the figure, the fitting lever 130 includes a pair of lever bodies 131 which are arranged to be opposite to each other so that a pair of outer side surfaces of the first connector housing 110 are sandwiched, a coupling member 132 that connects the pair of lever bodies 131 at one end side, pivoting fulcrum holes 133 which are formed in the lever bodies 131 and are pivotably engaged with the shafts 111 on the outer side surfaces of the first connector housing 110, and action point protruding parts 134 which are engaged with lever retaining holes 122, which are formed at the outer side surfaces of the outer sheath wall part 121, when a fitting operation begins after the first connector housing 110 and the second connector housing 120 are aligned to a fitting start position.

In the illustrated example, the coupling member 132 also serves as a force point part which receives the operating force when the lever bodies 131 are pivoted around the shafts 111.

For the lever connector 100 of the PTL1, the first connector housing 110 is fitted and connected with the second connector housing 120 with the following steps.

First, as shown in the figure, the fitting lever 130 is pivotably attached to the first connector housing 110. Then, as shown by an arrow X1 in FIG. 17, the distal end of the first connector housing 110 is inserted into the outer sheath wall part 121 of the second connector housing 120, the first connector housing 110 and the second connector housing 120 are aligned to the fitting start position, and the action point protruding parts 134 of the fitting lever 130 are engaged with the lever retaining holes 122 of the second connector housing 120.

Then, the coupling member 132 of the fitting lever 130 is pressed down, and as shown by the arrow R1 in FIG. 17, the fitting lever 130 is pivoted. The second connector housing 120 is drawn toward the first connector housing 110 with the pivoting movement of the fitting-operation lever 130, and the connector housings have been fitted with each other.

When the connector housings fitted with each other are to be detached, the coupling member 132 is pivoted in a direction opposite to the direction shown by the arrow R1 in FIG. 17 so that the connector housings are detached from each other.

CITATION LIST

Patent Literature

PTL1: Japanese Patent No. 3442661

SUMMARY OF THE INVENTION

Technical Problem

However, in the case of the lever connector 100 of the PTL1, the fitting lever 130 cannot be removed from the first connector housing 110 when the connector housings are fitted with each other.

Therefore, in the case of the lever connector 100 of the PTL1, even when the connector housings are actually used after the connector housings have been fitted and connected with each other, the weight of the fitting lever 130 is added so that the weight of the connector is increased.

In the case of the lever connector 100 of the PTL1, the lever connector 100 must be accompanied by the fitting lever 130, and there is a problem which is that the cost is increased because of the increase of the component number.

The object of the present invention is to solve the above problems and provide a lever connector which makes it possible to reduce the cost due to the reduction of the component number and reduce the weight in a use state.

Solution to Problem

The above-mentioned object of the present invention is achieved by the following constructions.

(1) According to an aspect of the invention a lever connector includes a first connector housing, a second connector housing which is fitted and connected with the first connector housing, and a fitting lever which is pivotably installed to the first connector housing as a lever member to reduce the operating force to fit and detach the first connector housing with and from the second connector housing. The first connector housing includes lever supporting shafts which are respectively protruded from a pair of outer surfaces to support the fitting lever to be pivotable, the second connector housing includes an outer sheath wall part which is fitted with the outer circumference of the first connector housing, shaft guiding slots which are formed by cutting a pair of opposed side walls of the outer sheath wall part along the fitting direction of the connector housing, and in which, when the connector housings are fitted with each other, the lever supporting shafts are fitted movably along the fitting direction of the connector housings, and action receiving shafts which are protruded from the outer surfaces of the side walls, where the shaft guiding slots are formed, and are located with a predetermined distance from the shaft guiding slots in a direction perpendicular to the fitting direction of the connector housings. The fitting lever includes a pair of lever bodies which are arranged to be opposed to each other to sandwich the outer surfaces of the pair of side walls of the second connector housing where the shaft guiding slots are formed, and a force point part which receives an operating force to make the pair of lever bodies pivot around the lever supporting shafts. The lever bodies include first shaft introducing grooves which are formed to open at side edges at the insertion side to the outer surfaces of the pair of side walls of the second connector housing, and which introduce the lever supporting shafts, which are inserted through the shaft guiding slots, to first initial engaged positions when the pair of lever bodies are inserted and installed to the outer surfaces of the pair of side walls in an initial inclined state, second shaft introducing grooves which are formed to open at side edges at the insertion side to the outer surfaces of the pair of side walls of the second connector housing, and which introduce the action receiving shafts to second initial engaged positions when the pair of lever bodies are inserted and installed to the outer surfaces of the pair of side walls in the initial inclined state, pivoting fulcrum parts which are set at positions spaced a predetermined distance from the first initial engaged positions along an initial engaging straight line that is a straight line which passes the center of the lever supporting shafts and the center of the action receiving shafts while the first connector housing and the second connector housing are aligned at a fitting start position, and with which the lever supporting shafts are pivotably engaged, first communicating grooves which are formed to straightly link the first initial engaged positions and the pivoting fulcrum parts, and which introduce the lever supporting shafts at the first initial engaged positions to the pivoting fulcrum parts when the lever bodies are moved straightly along the initial engaging straight line, action receiving parts which are set at positions spaced a predetermined distance from the second initial engaged positions along the initial engaging straight line, and with which the action receiving shafts are engaged when the lever supporting shafts are moved to the pivoting fulcrum parts, second communicating grooves which are formed to straightly link the second initial engaged positions and the action receiving parts, and which introduce the action receiving shafts at the second initial engaged positions to the action receiving parts when the lever supporting shafts at the first initial engaged positions are moved to the pivoting fulcrum parts, first shaft detaching grooves which are provided adjacently to the first communicating grooves, have shapes corresponding to detachment moving traces which are different from the moving traces when the fitting lever is pivotably installed to the first connector housing, and make the lever supporting shafts, which are located at the pivoting fulcrum parts, escape to the outside of the lever bodies with the movement of the fitting lever along the detachment moving traces, and second shaft detaching grooves which are provided adjacently to the second communicating grooves, have shapes corresponding to the detachment moving traces, and make the action receiving shafts, which are located at the action receiving parts, escape to the outside of the lever bodies with the movement of the fitting lever along the detachment moving traces.

(2) In the lever connector according to (1), the lever bodies include tracking protrusions on the inner surfaces, and the outer surfaces of the pair of side walls of the second connector housing which are opposed to the inner surfaces of the lever bodies include first movement regulating surfaces which regulate the movement direction of the lever bodies so that when the fitting lever is inserted and installed to the second connector housing, the tracking protrusions abut against the first movement regulating surfaces to make the lever supporting shafts arrive at the pivoting fulcrum parts, and second movement regulating surfaces which are formed so that the tracking protrusions are slidable on the second movement regulating surfaces while the pivoting operation of the fitting lever to make the connector housings to be fitted and connected with each other is completed, and regulate the movement courses of the lever bodies to courses corresponding to the detachment moving traces when an operation of detaching the fitting lever is performed while the tracking protrusions contact the second movement regulating surfaces.

(3) In the lever connector according to (2), the outer surfaces of the pair of side walls of the second connector housing, which are opposed to the inner surfaces of the lever bodies, include third movement regulating surfaces on which the tracking protrusions are slidable when the fitting lever is pivoted to make the connector housings to be fitted and connected with each other, and against which the tracking protrusions abut to regulate the lever bodies from moving to a detaching direction.

According to the construction of the above (1), after the first connector housing and the second connector housing are aligned at the fitting start position, the fitting lever is inserted and installed to the second connector housing.

When the first connector housing and the second connector housing are aligned at the fitting start position, the lever supporting shafts of the first connector housing are inserted through the shaft guiding slots of the second connector housing and become protruded from the outside surfaces of the second connector housing.

When the fitting lever is inserted and installed to the second connector housing, the fitting lever in the initial inclined state is inserted along the extending direction of the first shaft introducing grooves when the first shaft introducing grooves are positioned in accordance with the positions of the lever supporting shafts, which are protruded from the outside surfaces of the second connector housing. Thus, an initial engaged state is obtained which is that while the lever supporting shafts of the first connector housing arrive at the first initial engaged positions by the introduction of the first shaft introducing grooves, the action receiving shafts of the second connector housing arrive at the second initial engaged positions by the introduction of the second shaft introducing grooves.

From the initial engaged state, when the fitting lever is vertically moved a predetermined distance along an initial engaging straight line which is a straight line to connect the first initial engaged positions and the second initial engaged positions, while the lever supporting shafts arrive at the pivoting fulcrum parts by the introduction of the first communicating grooves, the action receiving shafts arrive at the action receiving parts by the introduction of the second communicating grooves, and a pivotable state is obtained which is that the fitting lever is pivotably coupled to the lever supporting shafts of the first connector housing.

When the fitting lever in the pivotable state is pivoted in the fitting direction, with the pivoting of the lever bodies around the lever supporting shafts, while the pivoting fulcrum parts push the lever supporting shafts toward the second connector housing, the action receiving parts push the action receiving shafts toward the first connector housing. That is, with the pivoting, the lever bodies function as lever members that act a force in the fitting direction of the connector housings, and the fitting of the connector housings is deepened by a small operating force. When the fitting lever is pivoted to the pivoting final position, the connector housings have been fitted and connected with each other.

While the connector housings have been fitted and connected with each other, when the fitting lever is pivoted in a direction reverse to the fitting direction, a force reverse to that when the fitting operation is performed is acted on the connector housings from the lever bodies, which are lever members, and the connector housings can be returned to the state of being aligned at the fitting start position.

While the connector housings have been fitted and connected with each other, when the fitting lever is moved along the detachment moving traces which are set beforehand, while the lever supporting shafts escape to the outside of the lever bodies through the first shaft detaching grooves, the action receiving shafts escape to the outside of the lever bodies through the second shaft detaching grooves, and the fitting lever can be detached from the connector housings.

Furthermore, by inserting the detached fitting lever to the second connector housing to follow the detachment moving traces adversely, it is possible to return to the installed state which is that the fitting lever is installed to the second connector housing after the connector housings have been fitted and connected with each other (installed again).

That is, according to the construction of the above (1), since after the connector housings have been fitted and connected with each other, the fitting lever is detached from the connector housings, a reduction in weight can be realized in an use state of the connector.

The detached fitting lever can be used in fitting other lever connectors. Therefore, the component set of a regular lever connector only includes the first connector housing and the second connector housing but does not include the fitting lever, so that the cost can be reduced due to the reduction of the component number.

According to the construction of the above (2), when the fitting lever is installed to the connector housings which are aligned at the fitting start position, or when the installed fitting lever is removed, only by moving the fitting lever so that the tracking protrusions, which the lever bodies of the fitting lever are equipped with, slide on the first movement regulating surfaces, the fitting lever can be inserted/detached smoothly without being twisted.

When the fitting lever is removed from the connector housings after the connector housings have been fitted and connected with each other, or when the fitting lever is installed again, only by moving the fitting lever so that the tracking protrusions, which the lever bodies of the fitting lever are equipped with, slide on the second movement regulating surfaces, the fitting lever can be inserted/detached smoothly without being twisted.

Therefore, it is possible to smoothly and easily insert/detach the fitting lever to/from the connector housings, either when the connector housings start to be fitted with each other or when the connector housings have been fitted with each other.

According to the construction of the above (3), in the middle of fitting the connector housings with each other, since the tracking protrusions which the fitting lever is equipped with abut against the third movement regulating surfaces of the second connector housing, the fitting lever is regulated from moving away from the second connector housing so that the fitting lever cannot be detached.

That is, according to the construction of the above (3), if after the operation of pivoting the fitting lever, the fitting lever cannot be detached from the connector housings, the connector housings are in the middle of fitting (half fitted state). Thus, it is possible to determine the fitted state of the connector housings from whether it is possible to detach the fitting lever, and it can be prevented that poor fitting of the connector housings with each other is overlooked.

Advantageous Effects of Invention

According to the lever connector of the present invention, after the connector housings have been fitted with each other, the fitting lever is detached from the connector housings so that a reduction in weight can be realized in an use state of the connector.

The detached fitting lever can be used in fitting other lever connectors. Therefore, the component set of a regular lever connector only includes the first connector housing and the second connector housing but does not include the fitting lever, so that the cost can be reduced due to the reduction of the component number.

The present invention has been briefly described above. Further, details of the present invention will become more apparent after embodiments of the invention described below (hereinafter referred to as "embodiments") are read with reference to the accompanying Figures.

DESCRIPTION OF EMBODIMENTS

A preferred embodiment of the lever connector according to the present invention is described in detail with reference to the figures as follows.

Figure 1:
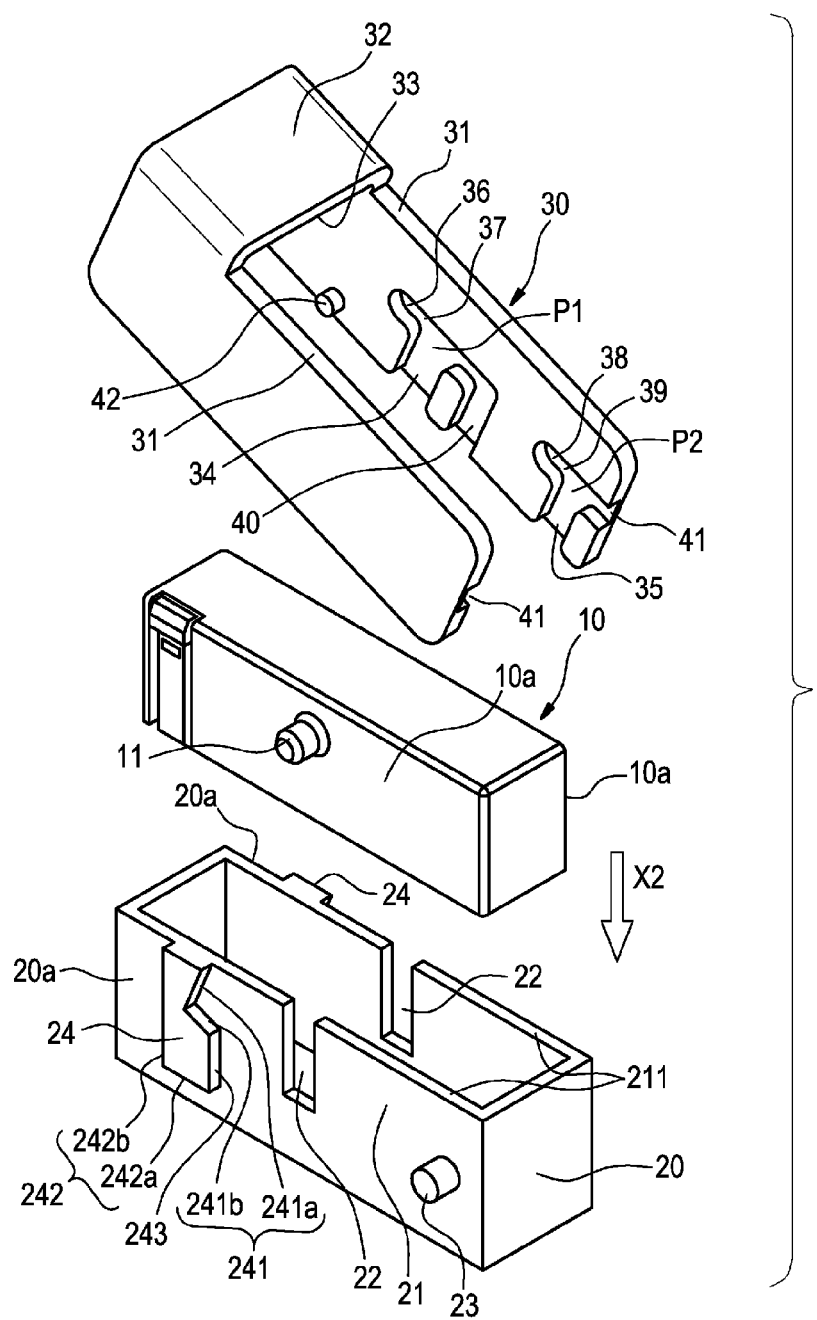
FIG. 1 is an exploded perspective view of a lever connector according to one embodiment of the present invention.
Figure 2:
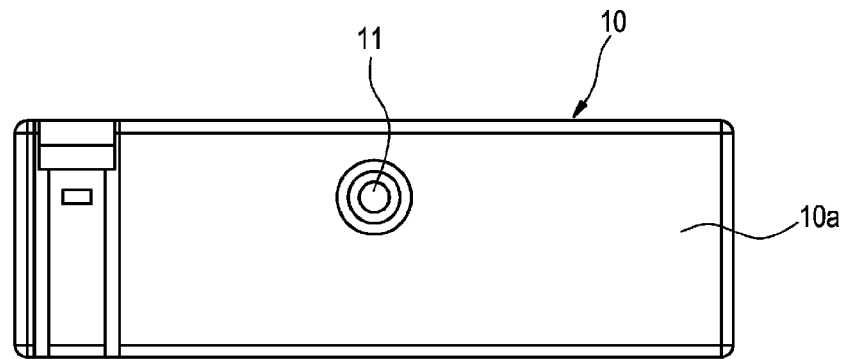
FIG. 2 is a side view of a first connector housing shown in FIG. 1.
Figure 3:
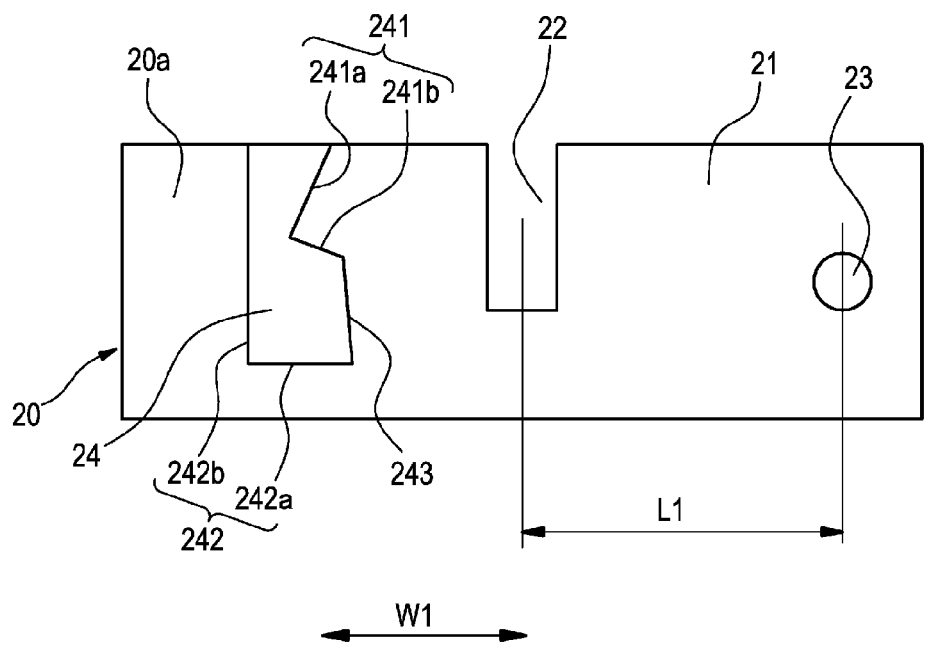
FIG. 3 is a side view of a second connector housing shown in FIG. 1.
Figure 4:
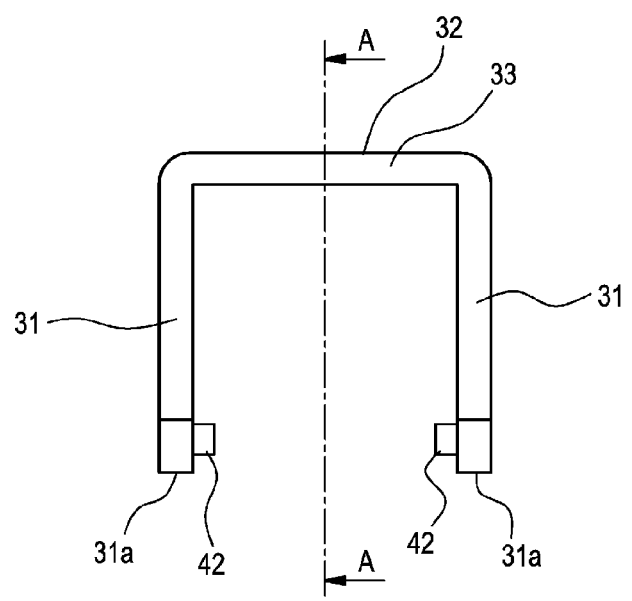
FIG. 4 is a front view of a fitting lever shown in FIG. 1.
Figure 5:
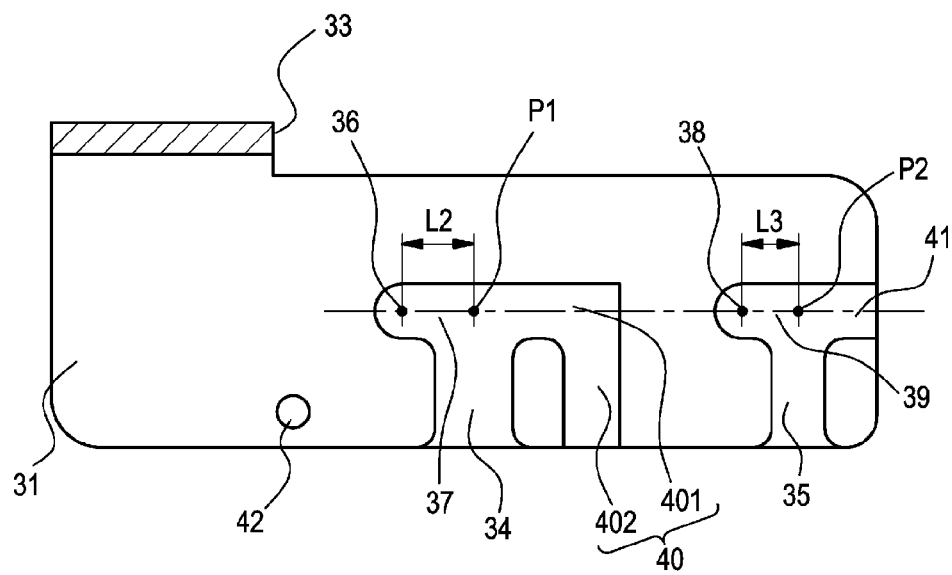
FIG. 5 is an A-A sectional view of FIG. 4.

FIGS. 1 to 5 show a lever connector according to one embodiment of the present invention. FIG. 1 is an exploded perspective view of the lever connector of the embodiment. FIG. 2 is a side view of a first connector housing shown in FIG. 1. FIG. 3 is a side view of a second connector housing shown in FIG. 1. FIG. 4 is a front view of a fitting lever shown in FIG. 1. FIG. 5 is an A-A sectional view of FIG. 4.

As shown in FIG. 1, a lever connector 1 of the present embodiment includes a first connector housing 10, a second connector housing 20 which is fitted and connected with the first connector housing 10, and a fitting lever 30 which is pivotably installed to the first connector housing 10.

As shown in FIGS. 1 and 2, lever supporting shafts 11 are respectively protruded from a pair of outside surfaces 10a of the first connector housing 10. The lever supporting shafts 11 are cylindrical shafts which support the fitting lever 30 to be pivotable.

As shown in FIGS. 1 and 2, the second connector housing 20 includes an outer sheath wall part (hood part) 21, shaft guiding slots 22, action receiving shafts 23 and movement regulating parts 24.

The outer sheath wall part 21 is formed into a rectangular pipe-like shape, and is fitted with the outer circumference of the first connector housing 10. A pair of opposed side walls 211 of the outer sheath wall part 21 are walls on which a pair of outside surfaces 10a of the first connector housing 10 are overlapped. The outer surfaces of the pair of side walls 211 are a pair of outside surfaces 20a of the second connector housing 20.

Figure 6:
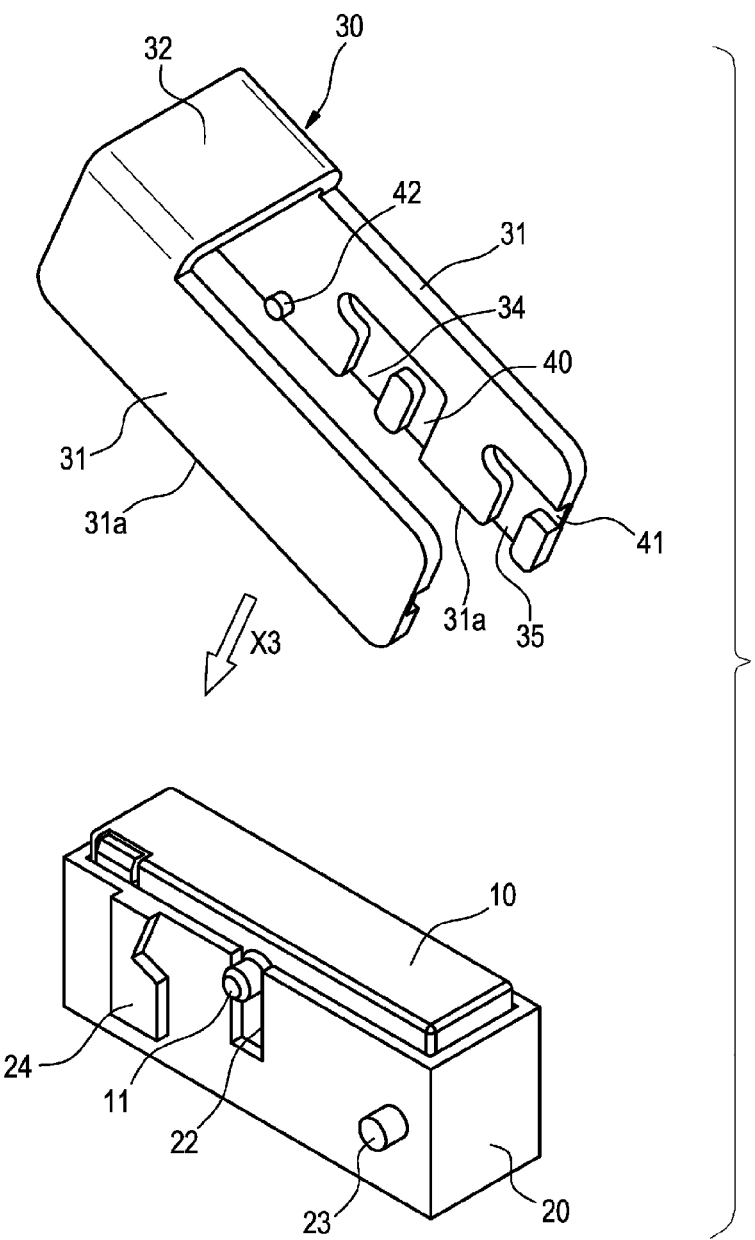
FIG. 6 is a perspective view which indicates a state before the fitting lever is installed to the second connector housing after the first connector housing is aligned at a fitting start position.
Figure 7:
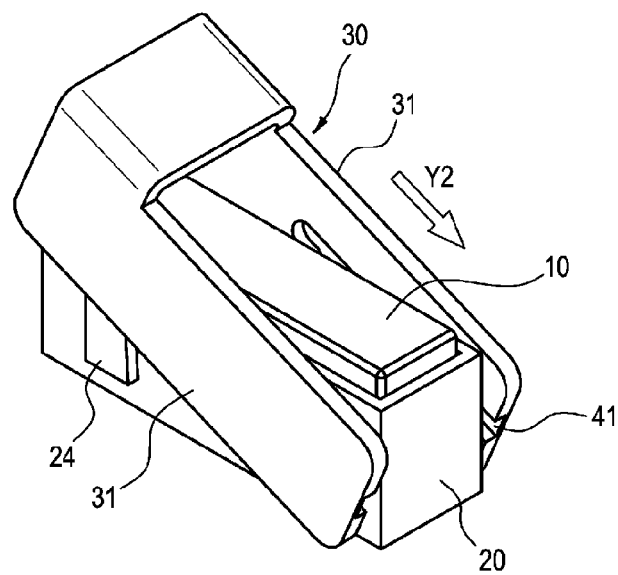
FIG. 7 is a perspective view which indicates a state while the fitting lever is installed to the second connector housing after the first connector housing is aligned at the fitting start position.

The shaft guiding slots 22 are slots which are formed by cutting the pair of opposed side walls 211 of the outer sheath wall part 21. The shaft guiding slots 22 are cut along the fitting direction (arrow X2 direction of FIG. 1) of the connector housings 10, 20. The width of the shaft guiding slots 22 is formed to be slightly bigger than that of the lever supporting shafts 11. The shaft guiding slots 22 are slots into which, when the connector housings 10, 20 are fitted with each other, the lever supporting shafts 11 are fitted movably along the fitting direction of the connector housings 10, 20, as shown in FIG. 6.

The action receiving shafts 23 are cylindrical protrusions which are protruded from the outer surfaces of the side walls 211 where the shaft guiding slots 22 are formed. As shown in FIG. 3, the action receiving shafts 23 are protruded and located with a predetermined distance L1 from the shaft guiding slots 22 in a direction (arrow W1 direction of FIG. 3) perpendicular to the fitting direction of the connector housings 10, 20.

The movement regulating parts 24 are raised structures which are formed on the pair of outside surfaces 20a of the second connector housing 20 which are opposed to the inner surfaces of lever bodies 31 of the fitting lever 30 to be described below.

The movement regulating parts 24 are equipped to regulate the movement direction of the fitting lever 30 to facilitate the installing operation of the fitting lever 30 when the fitting lever 30 is inserted and installed to the second connector housing 20.

Specifically, the movement regulating parts 24 are means for regulating the movement direction of the fitting lever 30, and include first movement regulating surfaces 241, second movement regulating surfaces 242 and third movement regulating surfaces 243.

The first movement regulating surfaces 241 regulate the movement direction of the lever bodies 31 so that when the fitting lever 30 is inserted and installed to the second connector housing 20, tracking protrusions 42 on the lever bodies 31 to be described below abut against the first movement regulating surfaces 241 to make the lever supporting shafts 11 arrive at pivoting fulcrum parts 36 to be described below. Specifically, the first movement regulating surfaces 241 are formed with first inclined surfaces 241a which extend obliquely downward from the upper ends of the side walls 211, and second inclined surfaces 241b which extend from the lower ends of the first inclined surfaces 241a.

Figure 8:
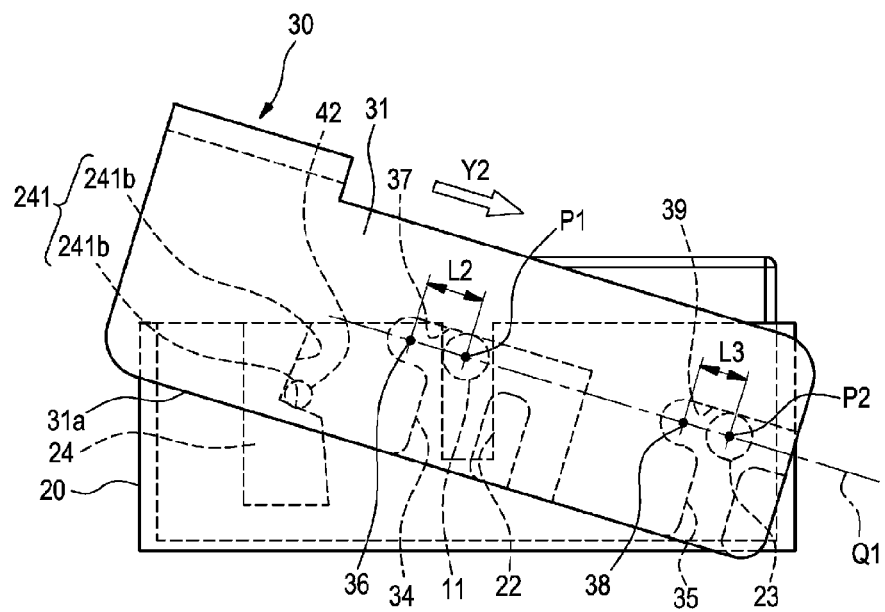
FIG. 8 is a side view of the lever connector shown in FIG. 7.

The first inclined surfaces 241a are slopes on which tracking protrusions 42 of the lever bodies 31 to be described below slide, as shown in FIG. 8, to regulate the movement direction of the fitting lever 30 at the initial stage of an inserting operation when the lever supporting shafts 11 arrive at first initial engaged positions P1 of the lever bodies 31 to be described below.

Figure 10:
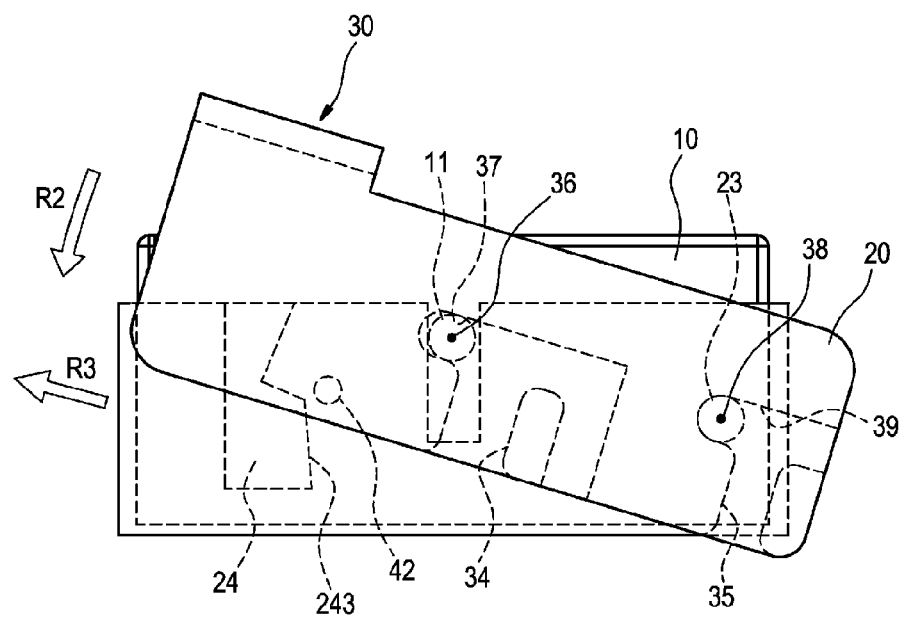
FIG. 10 is a side view of the lever connector shown in FIG. 9.

The second inclined surfaces 241b are slopes on which the tracking protrusions 42 slide, as shown in FIG. 10, to regulate the movement direction of the fitting lever 30 when the lever supporting shafts 11 are moved from the first initial engaged positions P1 to be described below to the pivoting fulcrum parts 36. The second inclined surfaces 241b are formed to be bent perpendicularly to the first inclined surfaces 241a.

The second movement regulating surfaces 242 are surfaces to regulate the movement direction of the lever bodies 31 when the fitting lever 30 is moved to be removed from the connector housings 10, 20 after the pivoting operation of the fitting lever to make the connector housings 10, 20 to be fitted and connected with each other is completed.

The second movement regulating surfaces 242 are equipped so that the tracking protrusions 42 to be described below are slidable on the second movement regulating surfaces 242 while the pivoting operation of the fitting lever 30 to make the connector housings 10, 20 to be fitted and connected with each other is completed, and regulate the movement courses of the lever bodies 31 to courses corresponding to detachment moving traces to be described below when an operation of detaching the fitting lever 30 is performed while the tracking protrusions 42 to be described below contact the second movement regulating surfaces 242.

Figure 12:
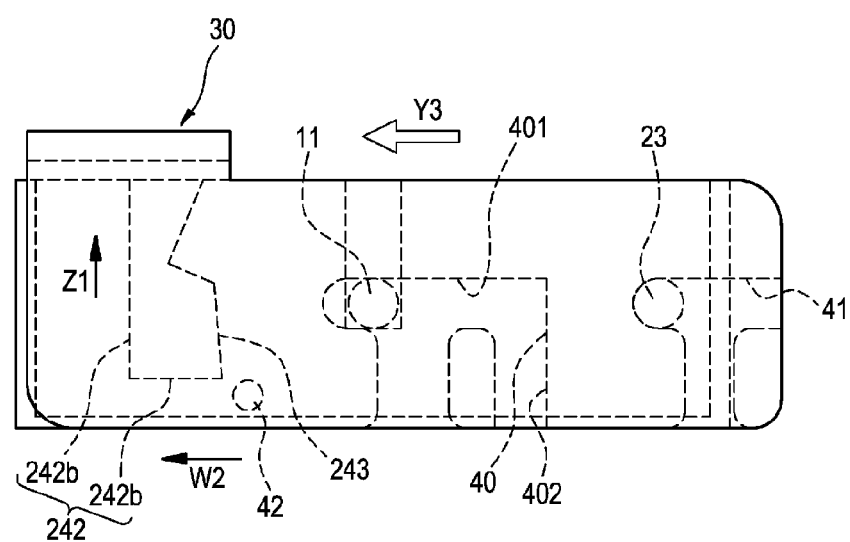
FIG. 12 is a side view of the lever connector shown in FIG. 11.

Specifically, as shown in FIG. 12, the second movement regulating surfaces 242 include first guiding surfaces 242a which guide the tracking protrusions 42 to a direction (arrow W2 direction of FIG. 12) perpendicular to the fitting direction of the connector housings, when the pivoting operation of the fitting lever 30 to make the connector housings 10, 20 to be fitted and connected with each other is completed, and second guiding surfaces 242b which guide the tracking protrusions 42 vertically upward (arrow Z1 direction of FIG. 12) from the final ends of the first guiding surfaces 242a.

The third movement regulating surfaces 243 are so formed that when the fitting lever 30 is pivoted to make the connector housings 10, 20 to be fitted and connected with each other, the tracking protrusions 42 to be described are slidable on the third movement regulating surfaces 243, and regulate the lever bodies 31 from moving to the detaching direction (for example, movement direction along the first guiding surfaces 242a) when the tracking protrusions 42 to be described abut against the third movement regulating surfaces 243.

The fitting lever 30 is a member by which an operating force to fit/detach the first connector housing 10 into/from the second connector housing 20 can be reduced, and is pivotably installed to the first connector housing 10.

The fitting lever 30 includes a pair of lever bodies 31, and a force point part 32, as shown in FIG. 1.

The pair of lever bodies 31 are roughly plate-like members which function as lever members, and are arranged to be opposed to each other to sandwich the outer surfaces of the pair of side walls 211 of the second connector housing 20 where the shaft guiding slots 22 are formed.

The force point part 32 is a part which receives an operating force to make the pair of lever bodies 31 pivot around the lever supporting shafts 11. In the present embodiment, the force point part 32 is provided as a coupling member 33 which couples one ends of the pair of lever bodies 31.

The pair of lever bodies 31 include first shaft introducing grooves 34, second shaft introducing grooves 35, pivoting fulcrum parts 36, first communicating grooves 37, action receiving parts 38, second communicating grooves 39, first shaft detaching grooves 40, second shaft detaching grooves 41 and tracking protrusions 42, on the inner surfaces as show in FIGS. 4 and 5.

The first shaft introducing grooves 34 are grooves which are formed to open at side edges 31a of the lever bodies 31 which become insertion sides (bottom sides in FIG. 5) of the lever bodies 31 which are inserted to the outer surfaces of the pair of side walls 211 of the second connector housing 20. The width of the first shaft introducing grooves 34 is formed to be slightly bigger than the outer diameter of the lever supporting shafts 11.

The first shaft introducing grooves 34 are grooves which introduces the lever supporting shafts 11, which are inserted through the shaft guiding slots 22, to the first initial engaged positions P1, when the pair of lever bodies 31 are inserted and installed to the outer surfaces of the pair of side walls 211 while the pair of lever bodies 31 are in an initial, inclined (from the second connector housing 20) state, as shown in FIG. 8.

In the above-mentioned initial inclined state, the side edges 31a, which are the lower edges of the lever bodies 31, are inclined to be parallel with an initial engaging straight line Q1 shown in FIG. 8. The initial engaging straight line Q1 is a straight line which passes the center of the lever supporting shafts 11 and the center of the action receiving shafts 23 while the first connector housing 10 and the second connector housing 20 are aligned at a fitting start position.

The first initial engaged positions P1 are positions where the lever supporting shafts 11 abut against the final ends of the first shaft introducing grooves 34 while the first connector housing 10 and the second connector housing 20 are aligned at the fitting start position.

The second shaft introducing grooves 35 are grooves which are formed to open at the above-described side edges 31a to be parallel with the above-described first shaft introducing grooves 34 as shown in FIG. 5. The width of the second shaft introducing grooves 35 is formed to be slightly bigger than the outer diameter of the action receiving shafts 23.

The second shaft introducing grooves 35 are grooves which introduces the action receiving shafts 23 to second initial engaged positions P2, when the pair of lever bodies 31 are inserted and installed to the outer surfaces of the pair of side walls 211 while the pair of lever bodies 31 are in the initial, inclined (from the second connector housing 20) state, as shown in FIG. 8.

The second initial engaged positions P2 are positions where the action receiving shafts 23 abut against the final ends of the second shaft introducing grooves 35 while the first connector housing 10 and the second connector housing 20 are aligned at the fitting start position.

The pivoting fulcrum parts 36 are sites where the lever supporting shafts 11 are pivotably engaged. The pivoting fulcrum parts 36 are set at positions spaced a predetermined distance L2 from the first initial engaged positions P1 along the initial engaging straight line Q1 which is a straight line to link the first initial engaged positions P1 and the second initial engaged positions P2, as shown in FIG. 8.

The first communicating grooves 37 are grooves which are formed to straightly link the first initial engaged positions P1 and the pivoting fulcrum parts 36. The width of the first communicating grooves 37 is formed to be slightly bigger than the outer diameter of the lever supporting shafts 11. The first communicating grooves 37 introduce the lever supporting shafts 11 at the first initial engaged positions P1 to the pivoting fulcrum parts 36 when the lever bodies 31 are moved straightly in the arrow Y2 direction of FIG. 8 along the initial engaging straight line Q1.

The action receiving parts 38 are sites where the action receiving shafts 23 are pivotably engaged. The action receiving parts 38 are set at positions spaced a predetermined distance L3 from the second initial engaged positions P2 along the above-described initial engaging straight line Q1, as shown in FIG. 8.

The second communicating grooves 39 are grooves which are formed to straightly link the second initial engaged positions P2 and the action receiving parts 38. The width of the second communicating grooves 39 is formed to be slightly bigger than the outer diameter of the action receiving shafts 23. The second communicating grooves 39 introduce the action receiving shafts 23 at the second initial engaged positions P2 to the action receiving parts 38 with the movement of the lever supporting shafts 11 at the first initial engaged positions P1 to the pivoting fulcrum parts 36.

The first shaft detaching grooves 40 are grooves which make the lever supporting shafts 11, which are located at the pivoting fulcrum parts 36, escape to the outside of the lever bodies 31 with the movement of the fitting lever 30 along the detachment moving traces after the connector housings have been fitted and connected with each other.

The first shaft detaching grooves 40 are provided adjacently to the first communicating grooves 37, and have shapes corresponding to the detachment moving traces so that the moving course is different from that when the fitting lever 30 is pivotably installed to the first connector housing 10.

The moving traces when the fitting lever 30 is pivotably installed to the first connector housing 10 are traces provided by the extension shapes of the first movement regulating surfaces 241 in the movement regulating parts 24. In contrast, the detachment moving traces are traces provided by the extension shapes of the second movement regulating surfaces 242 in the movement regulating parts 24.

Therefore, the first shaft detaching grooves 40 include first detaching grooves 401 of a straight shape corresponding to the first guiding surfaces 242a of the second movement regulating surfaces 242, and second detaching grooves 402 of a straight shape corresponding to the second guiding surfaces 242b as shown in FIG. 5.

The second shaft detaching grooves 41 are grooves which make the action receiving shafts 23, which are located at the action receiving parts 38, escape to the outside of the lever bodies 31 with the movement of the fitting lever 30 along the detachment moving traces after the connector housings have been fitted and connected with each other. The second shaft detaching grooves 41 are provided adjacently to the second communicating grooves 39, and have a straight shape corresponding to the detachment moving traces due to the above-described first guiding surfaces 242a of the movement regulating parts 24.

The tracking protrusions 42 are cylindrical pins which are protruded from the inner surfaces of the lever bodies 31. The tracking protrusions 42 slide respectively on the movement regulating surfaces 241, 243, 242, which the movement regulating parts 24 of the second connector housing 20 provides, to regulate the movement direction of the lever bodies 31.

Next, a method of fitting and connecting the connector housings 10, 20 with each other and a detaching method with the fitting lever 30 after the fitting and connecting in the lever connector 1 of the present embodiment are described based on FIGS. 6 to 16.

For the lever connector 1 of the embodiment, as shown in FIG. 6, after the first connector housing 10 and the second connector housing 20 are aligned at the fitting start position, the fitting lever 30 is inserted and installed to the second connector housing 20.

When the first connector housing 10 is inserted into the second connector housing 20 in the direction as shown with the arrow X2 in FIG. 1 and the first connector housing 10 and the second connector housing 20 are aligned at the fitting start position, as shown in FIG. 6, the lever supporting shafts 11 of the first connector housing 10 are inserted through the shaft guiding slots 22 of the second connector housing 20 and become protruded from the outside surfaces 10a of the second connector housing 20.

When the fitting lever 30 is inserted and installed to the second connector housing 20, the fitting lever 30 in the initial inclined state along the initial engaging straight line Q1 of FIG. 8 is inserted along the extending direction (a direction as shown with the arrow X3 in FIG. 6) of the first shaft introducing grooves 34 when the first shaft introducing grooves 34 are positioned in accordance with the positions of the lever supporting shafts 11, which are protruded from the outside surfaces 10a of the second connector housing 20.

Practically, when the fitting lever 30 is inserted into the second connector housing 20, the fitting lever 30 in the above-described initial inclined state is so inserted that the tracking protrusions 42 abut against the initial ends of the first movement regulating surfaces 241 in the movement regulating parts 24 of the second connector housing 20, and the tracking protrusions 42 slide on the first inclined surfaces 241a. Thus, because the inserting operation is performed while the tracking protrusions 42 abut against the first movement regulating surfaces 241, a special positioning operation to position the first shaft introducing grooves 34 in accordance with the positions of the lever supporting shafts 11 is not necessary, and the lever supporting shafts 11 can be easily put in the first shaft introducing grooves 34. Thus, an initial engaged state is obtained which is that while the lever supporting shafts 11 arrive at the first initial engaged positions P1 by the introduction of the first shaft introducing grooves 34, the action receiving shafts 23 of the second connector housing 20 arrive at the second initial engaged positions P2 by the introduction of the second shaft introducing grooves 35.

Figure 9:
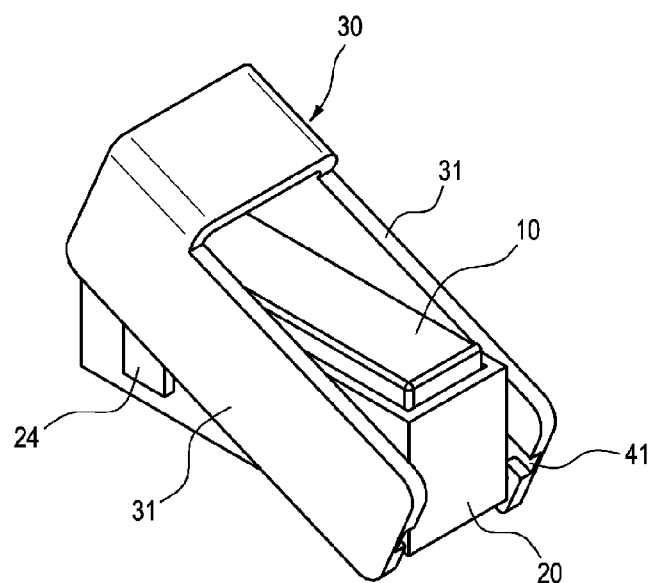
FIG. 9 is a perspective view which indicates that the fitting lever is moved straightly in the arrow Y2 direction of FIGS. 7 and 8 from the state shown in FIG. 7 to a pivoting start position.

From the above-described initial engaged state, the tracking protrusions 42 are slid on the second inclined surfaces 241b in the movement regulating parts 24 to be moved the predetermined distance L2 along the initial engaging straight line Q1 as shown with the arrow Y2 in FIG. 8. Then, while the lever supporting shafts 11 arrive at the pivoting fulcrum parts 36 by the introduction of the first communicating grooves 37, the action receiving shafts 23 arrive at the action receiving parts 38 by the introduction of the second communicating grooves 39, and a pivotable state is obtained which is that the fitting lever 30 is pivotably coupled to the lever supporting shafts 11 of the first connector housing 10, as shown in FIGS. 9 and 10.

Figure 11:
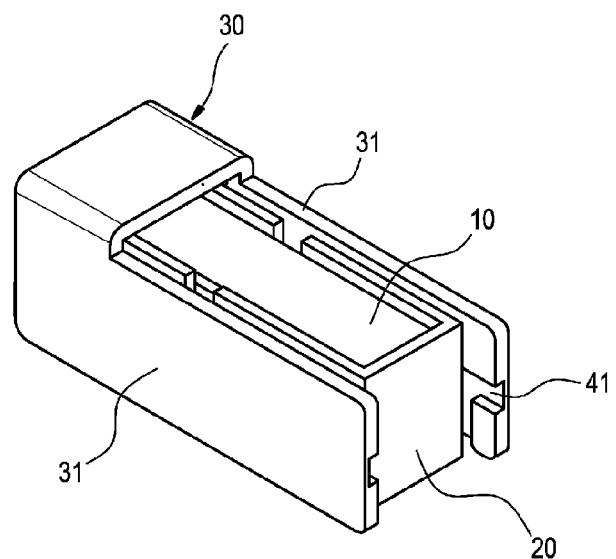
FIG. 11 is a perspective view which indicates that the fitting lever is pivoted in the arrow R2 direction of FIG. 10 from the state of FIG. 10, and the connector housings have been fitted and connected with each other.

When the fitting lever 30 in the pivotable state shown in FIG. 10 is pivoted in the fitting direction shown with the arrow R2 in FIG. 10, with the pivoting of the lever bodies 31 around the lever supporting shafts 11, while the pivoting fulcrum parts 36 push the lever supporting shafts 11 toward the second connector housing 20, the action receiving parts 38 push the action receiving shafts 23 toward the first connector housing 10. That is, with the pivoting, the lever bodies 31 function as lever members that act a force in the fitting direction of the connector housings 10, 20, and the fitting of the connector housings 10, 20 is deepened by a small operating force. When the fitting lever 30 is pivoted to the pivoting final position, as shown in FIGS. 11 and 12, the connector housings 10, 20 have been fitted and connected with each other.

In the present embodiment, when the fitting lever 30 is pivoted in the direction shown with the arrow R2 in FIG. 10, the tracking protrusions 42 move along the third movement regulating surfaces 243 of the movement regulating parts 24. Therefore, even if the fitting lever 30 is pulled in the middle of the pivoting, for example, to the detaching direction shown with the arrow R3 of FIG. 10, the movement to the detaching direction is regulated since the tracking protrusions 42 abut against the third movement regulating surfaces 243.

While the connector housings 10, 20 have been fitted and connected with each other as shown in FIG. 12, when the fitting lever 30 is pivoted in a direction reverse to the fitting direction (a direction reverse to the arrow R2 of FIG. 10), a force reverse to that when the fitting operation is performed is acted on the connector housings from the lever bodies 31, which are lever members, and the connector housings 10, 20 can be returned to the state of being aligned at the fitting start position.

Figure 13:
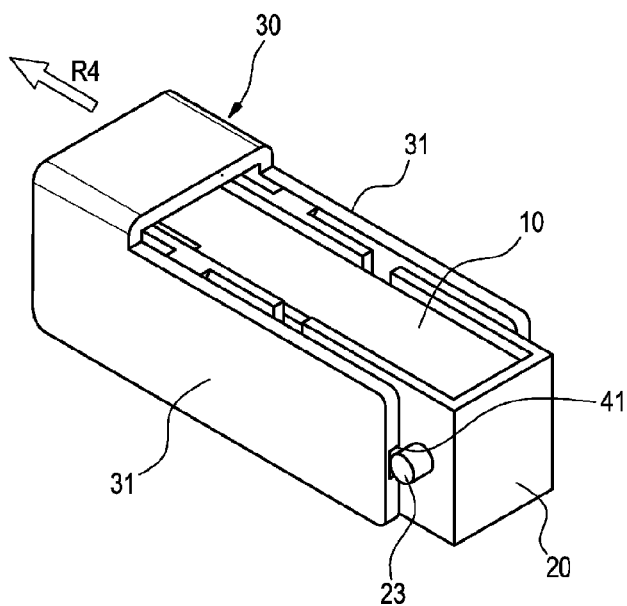
FIG. 13 is a perspective view which indicates that the fitting lever is moved straightly in the arrow Y3 direction of FIG. 12 to a detachable position.

While the connector housings 10, 20 have been fitted and connected with each other as shown in FIG. 12, when the fitting lever 30 is moved in the arrow R4 direction of FIG. 13 so that the tracking protrusions 42 move along the detachment moving traces which are set beforehand by the first guiding surfaces 242a of the movement regulating parts 24, the lever supporting shafts 11 move away from the first detaching grooves 401 of the first shaft detaching grooves 40 and arrive at the initial ends of the second detaching grooves 402. At this time, the action receiving shafts 23 escape to the outside of the lever bodies 31 through the second shaft detaching grooves 41, as shown in FIG. 13.

Figure 14:
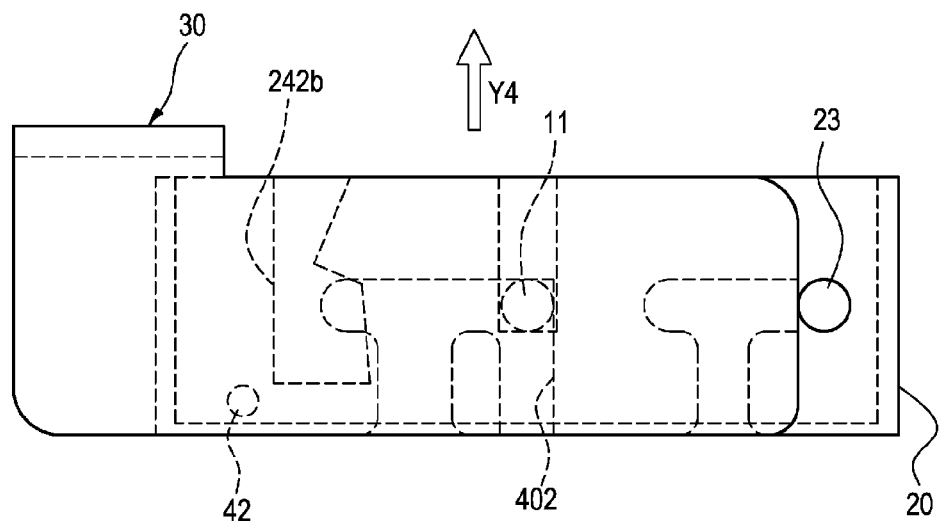
FIG. 14 is a side view of the lever connector shown in FIG. 13.
Figure 15:
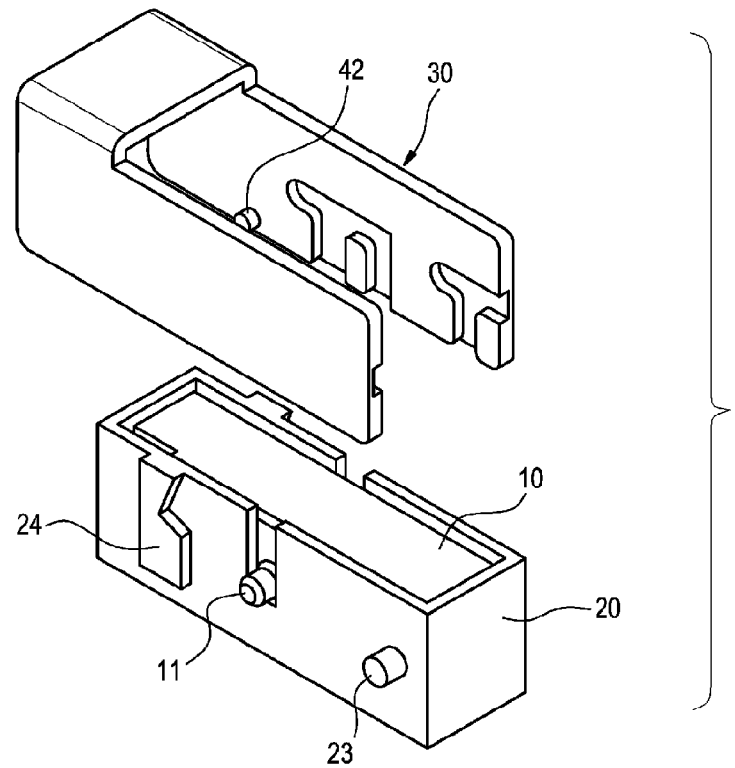
FIG. 15 is a perspective view which indicates that the fitting lever is pulled in the arrow Y4 direction of FIG. 14 from the state of FIG. 14, and is detached from the connector housings.
Figure 16:
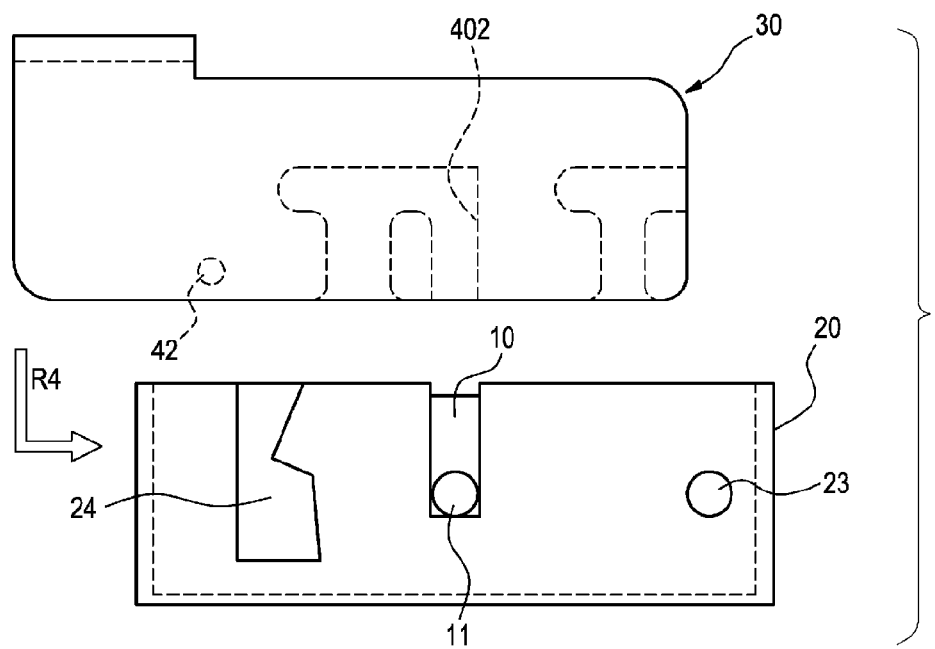
FIG. 16 is a side view of the lever connector shown in FIG. 15.
Figure 17:
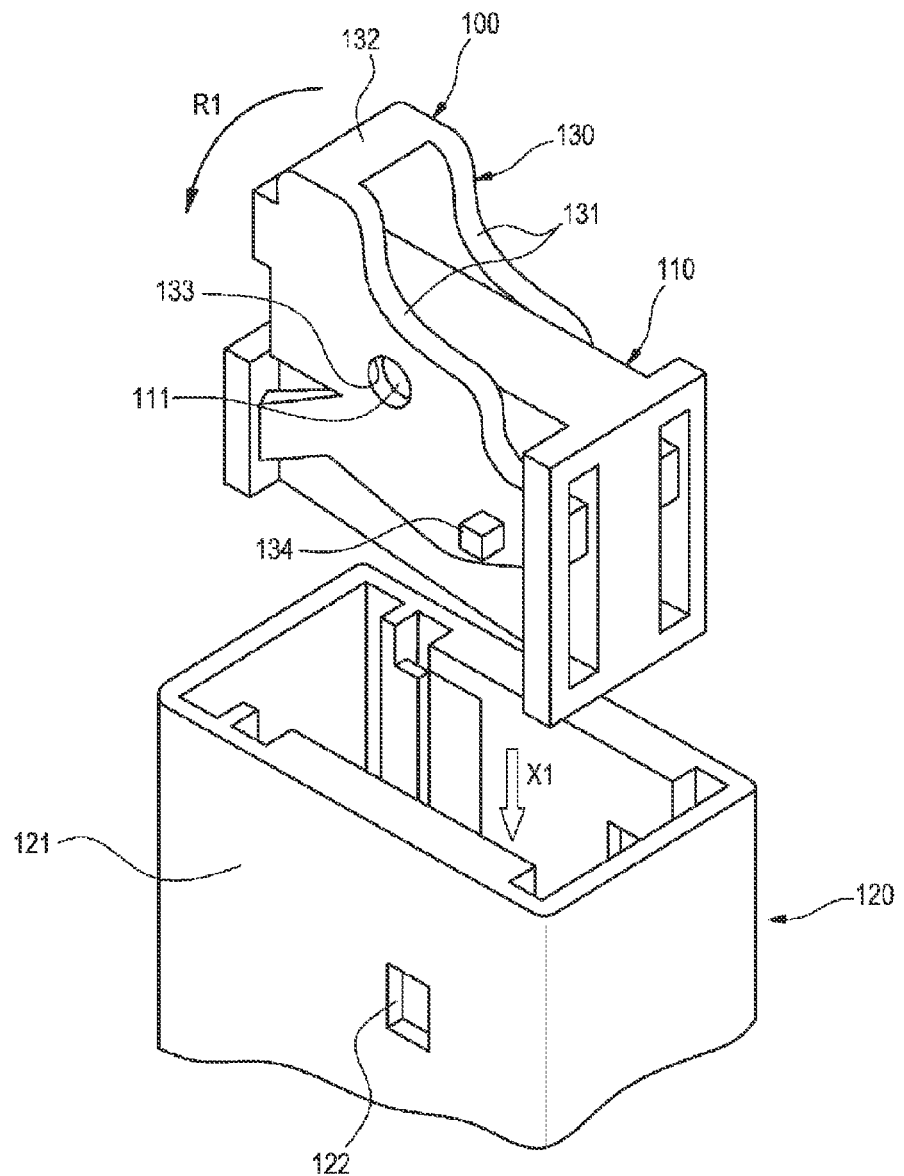
FIG. 17 is an exploded perspective view of a conventional lever connector.

When the fitting lever 30 is moved in the direction as shown with the arrow Y4 in FIG. 14 so that the tracking protrusions 42 move along the detachment moving traces which are set by the second guiding surfaces 242b of the movement regulating parts 24, as shown in FIGS. 15 and 16, the lever supporting shafts 11 escape to the outside of the lever bodies 31 through the second detaching grooves 402 of the first shaft detaching grooves 40, and the fitting lever 30 is detached from the connector housings 10, 20.

That is, while the connector housings 10, 20 have been fitted and connected with each other as shown in FIG. 12, when the fitting lever 30 is moved so that the tracking protrusions 42 move along the detachment moving traces which are set beforehand by the second movement regulating surfaces 242 of the movement regulating parts 24, while the lever supporting shafts 11 escape to the outside of the lever bodies 31 through the first shaft detaching grooves 40, the action receiving shafts 23 escape to the outside of the lever bodies 31 through the second shaft detaching grooves 41, and the fitting lever 30 can be detached from the connector housings 10, 20.

Furthermore, by inserting the detached fitting lever 30 in the direction of the arrow R4 in FIG. 16 to the second connector housing 20 to follow the detachment moving traces adversely, it is possible to return to the installed state which is that the fitting lever 30 is installed to the second connector housing 20 after the connector housings 10, 20 have been fitted and connected with each other (installed again).

That is, for the lever connector 1 shown in the present embodiment, since after the connector housings 10, 20 have been fitted and connected with each other, the fitting lever 30 is detached from the connector housings 10, 20, a reduction in weight can be realized in an use state of the connector.

The detached fitting lever 30 can be used in fitting other lever connectors. Therefore, the component set of a regular lever connector only includes the first connector housing 10 and the second connector housing 20 but does not include the fitting lever 30, so that the cost can be reduced by reducing the number of components.

Furthermore, for the lever connector 1 of the present embodiment, when the fitting lever 30 is installed to the connector housings which are aligned at the fitting start position, or when the installed fitting lever 30 is removed, only by moving the fitting lever 30 so that the tracking protrusions 42, which the lever bodies 31 of the fitting lever 30 are equipped with, slide on the first movement regulating surfaces 241, the fitting lever 30 can be inserted/detached smoothly without being twisted.

When the fitting lever 30 is removed from the connector housings 10, 20 after the connector housings 10, 20 have been fitted and connected with each other, or when the fitting lever 30 is installed again, only by moving the fitting lever 30 so that the tracking protrusions 42, which the lever bodies 31 of the fitting lever 30 are equipped with, slide on the second movement regulating surfaces 242, the fitting lever 30 can be inserted/detached smoothly without being twisted.

Therefore, it is possible to smoothly and easily insert/detach the fitting lever 30 to/from the connector housings, either when the connector housings 10, 20 start to be fitted with each other or when the connector housings 10, 20 have been fitted with each other.

Furthermore, for the lever connector 1 of the present embodiment, in the middle of fitting the connector housings 10, 20 with each other, since the tracking protrusions 42 which the fitting lever 30 is equipped with abut against the third movement regulating surfaces 243 of the second connector housing 20, the fitting lever 30 is regulated from moving away from the second connector housing 20 so that the fitting lever 30 cannot be detached.

That is, for the lever connector 1 of the present embodiment, if after the operation of pivoting the fitting lever 30, the fitting lever 30 cannot be detached from the connector housings 10, 20, the connector housings 10, 20 are in the middle of fitting (half fitted state). Thus, it is possible to determine the fitted state of the connector housings 10, 20 from whether it is possible to detach the fitting lever 30, and it can be prevented that poor fitting of the connector housings 10, 20 with each other is overlooked.

The present invention is not limited to the above-described embodiments, and suitable modifications, improvements and the like can be made. Moreover, the materials, shapes, dimensions, numbers, installation places, and the like of the components in the above embodiment are arbitrarily set as far as the invention can be attained, and not particularly restricted.

Although the present invention is described in detail with reference to the specific embodiments, it is apparent that various modifications and amendments may be made by those skilled in the art without departing from the spirit and scope of the present invention.

This application is based on the Japanese patent application (patent application No. 2012-034173) filed on Feb. 20, 2012, whose content is incorporated herein by reference.

The features of the lever connector according to the embodiment of the present invention described above are briefly, collectively listed in the following [1] to [3], respectively.

[1] A lever connector including:

a first connector housing (10), a second connector housing (20) which is fitted and connected with the first connector housing (10), and a fitting lever (30) which is pivotably installed to the first connector housing (10) as a lever member to reduce the operating force to fit/detach the first connector housing (10) with/from the second connector housing (20), wherein the first connector housing (10) includes lever supporting shafts (11) which are respectively protruded from a pair of outer surfaces (10a) to support the fitting lever (30) to be pivotable, the second connector housing (20) includes an outer sheath wall part (21) which is fitted with the outer circumference the first connector housing (10), shaft guiding slots (22) which are formed by cutting a pair of opposed side walls (211) of the outer sheath wall part (21) along the fitting direction of the connector housings, and in which when the connector housings are fitted with each other, the lever supporting shafts (11) are fitted movably along the fitting direction of the connector housings, and action receiving shafts (23) which are protruded from the outer surfaces of the side walls (211) where the shaft guiding slots (22) are formed, and are located with a predetermined distance from the shaft guiding slots (22) in a direction perpendicular to the fitting direction of the connector housings, the fitting lever (30) includes a pair of lever bodies (31) which are arranged to be opposed to each other to sandwich the outer surfaces of the pair of side walls (211) of the second connector housing (20) where the shaft guiding slots (22) are formed, and a force point part (32) which receives an operating force to make the pair of lever bodies (31) pivot around the lever supporting shafts (11), and the lever bodies include first shaft introducing grooves (34) which are formed to open at side edges at the insertion side to the outer surfaces of the pair of side walls (211) of the second connector housing (20), and which introduce the lever supporting shafts (11), which are inserted through the shaft guiding slots (22), to first initial engaged positions when the pair of lever bodies (31) are inserted and installed to the outer surfaces of the pair of side walls (211) in an initial inclined state, second shaft introducing grooves (35) which are formed to open at side edges at the insertion side to the outer surfaces of the pair of side walls (211) of the second connector housing (20), and which introduce the action receiving shafts (23) to second initial engaged positions when the pair of lever bodies (31) are inserted and installed to the outer surfaces of the pair of side walls (211) in the initial inclined state, pivoting fulcrum parts (36) which are set at positions spaced a predetermined distance from the first initial engaged positions along an initial engaging straight line that is a straight line which passes the center of the lever supporting shafts (11) and the center of the action receiving shafts (23) while the first connector housing (10) and the second connector housing (20) are aligned at a fitting start position, and with which the lever supporting shafts (11) are pivotably engaged, first communicating grooves (37) which are formed to straightly link the first initial engaged positions and the pivoting fulcrum parts (36), and which introduce the lever supporting shafts (11) at the first initial engaged positions to the pivoting fulcrum parts (36) when the lever bodies (31) are moved straightly along the initial engaging straight line, action receiving parts (38) which are set at positions spaced a predetermined distance from the second initial engaged positions along the initial engaging straight line, and with which the action receiving shafts (23) are engaged when the lever supporting shafts (11) are moved to the pivoting fulcrum parts (36), second communicating grooves (39) which are formed to straightly link the second initial engaged positions and the action receiving parts (38), and which introduce the action receiving shafts (23) at the second initial engaged positions to the action receiving parts (38) when the lever supporting shafts (11) at the first initial engaged positions are moved to the pivoting fulcrum parts (36), first shaft detaching grooves (40) which are provided adjacently to the first communicating grooves (37), have shapes corresponding to detachment moving traces which are different from the moving traces when the fitting lever (30) is pivotably installed to the first connector housing (10), and make the lever supporting shafts (11), which are located at the pivoting fulcrum parts (36), escape to the outside of the lever bodies (31) with the movement of the fitting lever (30) along the detachment moving traces, and second shaft detaching grooves (41) which are provided adjacently to the second communicating grooves (39), have shapes corresponding to the detachment moving traces, and make the action receiving shafts (23), which are located at the action receiving parts (38), escape to the outside of the lever bodies (31) with the movement of the fitting lever (30) along the detachment moving traces.

[2] The lever connector recorded in the above [1], wherein the lever bodies (31) include tracking protrusions (42) on the inner surfaces, and the outer surfaces of the pair of side walls (211) of the second connector housing (20) which are opposed to the inner surfaces of the lever bodies (31) include first movement regulating surfaces (241) which regulate the movement direction of the lever bodies (31) so that when the fitting lever (30) is inserted and installed to the second connector housing (20), the tracking protrusions (42) abut against the first movement regulating surfaces (241) to make the lever supporting shafts (11) arrive at the pivoting fulcrum parts (36), and second movement regulating surfaces (242) which are formed so that the tracking protrusions (42) are slidable on the second movement regulating surfaces (242) while the pivoting operation of the fitting lever (30) to make the connector housings to be fitted and connected with each other is completed, and regulate the movement courses of the lever bodies (31) to courses corresponding to the detachment moving traces when an operation of detaching the fitting lever (30) is performed while the tracking protrusions (42) contact the second movement regulating surfaces (242).

[3] The lever connector recorded in the above [2], wherein the outer surfaces of the pair of side walls (211) of the second connector housing (20), which are opposed to the inner surfaces of the lever bodies (31), include third movement regulating surfaces (243) on which the tracking protrusions (42) are slidable when the fitting lever (30) is pivoted to make the connector housings to be fitted and connected with each other, and against which the tracking protrusions (42) abut to regulate the lever bodies (31) from moving to a detaching direction.

INDUSTRIAL APPLICABILITY

According to the lever connector of the present invention, after the connector housings have been fitted with each other, the fitting lever is detached from the connector housings so that a reduction in weight can be realized in an use state of the connector.

The present invention which has the above effect is useful in the field of lever connector.

REFERENCE SIGNS LIST 1 lever connector
10 first connector housing
10a outside surface
11 lever supporting shaft
20 second connector housing
20a outside surface
21 outer sheath wall part (hood part)
22 shaft guiding slot
23 action receiving shaft
30 fitting lever
31 lever body
31a side edge at the insertion side
32 force point part
34 first shaft introducing groove
35 second shaft introducing groove
36 pivoting fulcrum part
37 first communicating groove
38 action receiving part
39 second communicating groove
40 first shaft detaching groove
41 second shaft detaching groove
42 tracking protrusion
211 side wall
241 first movement regulating surface
242 second movement regulating surface
243 third movement regulating surface
P1 first initial engaged position
P2 second initial engaged position
Q1 initial engaging straight line

The invention claimed is:

1. A lever connector comprising:
a first connector housing;
a second connector housing which is fitted and connected with the first connector housing; and
a fitting lever which is pivotably installed to the first connector housing as a lever member to reduce the operating force to fit and detach the first connector housing with and from the second connector housing,
wherein the first connector housing includes lever supporting shafts which are respectively protruded from a pair of outer surfaces to support the fitting lever to be pivotable,
the second connector housing includes:
an outer sheath wall part which is fitted with the outer circumference of the first connector housing,
shaft guiding slots which are formed by cutting a pair of opposed side walls of the outer sheath wall part along a fitting direction of the connector housing, and in which, when the connector housings are fitted with each other, the lever supporting shafts are fitted movably along the fitting direction of the connector housings; and
action receiving shafts which are protruded from the outer surfaces of the side walls, where the shaft guiding slots are formed, and are located with a predetermined distance from the shaft guiding slots in a direction perpendicular to the fitting direction of the connector housings, the fitting lever includes:
a pair of lever bodies which are arranged to be opposed to each other to sandwich the outer surfaces of the pair of side walls of the second connector housing where the shaft guiding slots are formed; and a force point part which receives an operating force to make the pair of lever bodies pivot around the lever supporting shafts, and the lever bodies include:

first shaft introducing grooves which are formed to open at side edges at an insertion side to the outer surfaces of the pair of side walls of the second connector housing, and which introduce the lever supporting shafts, which are inserted through the shaft guiding slots, to first initial engaged positions when the pair of lever bodies are inserted and installed to the outer surfaces of the pair of side walls in an initial inclined state;

second shaft introducing grooves which are formed to open at side edges at the insertion side to the outer surfaces of the pair of side walls of the second connector housing, and which introduce the action receiving shafts to second initial engaged positions when the pair of lever bodies are inserted and installed to the outer surfaces of the pair of side walls in the initial inclined state, pivoting fulcrum parts which are set at positions spaced a predetermined distance from the first initial engaged positions along an initial engaging straight line that is a straight line which passes the center of the lever supporting shafts and the center of the action receiving shafts while the first connector housing and the second connector housing are aligned at a fitting start position, and with which the lever supporting shafts are pivotably engaged, first communicating grooves which are formed to straightly link the first initial engaged positions and the pivoting fulcrum parts, and which introduce the lever supporting shafts at the first initial engaged positions to the pivoting fulcrum parts when the lever bodies are moved straightly along the initial engaging straight line, action receiving parts which are set at positions spaced a predetermined distance from the second initial engaged positions along the initial engaging straight line, and with which the action receiving shafts are engaged when the lever supporting shafts are moved to the pivoting fulcrum parts, second communicating grooves which are formed to straightly link the second initial engaged positions and the action receiving parts, and which introduce the action receiving shafts at the second initial engaged positions to the action receiving parts when the lever supporting shafts at the first initial engaged positions are moved to the pivoting fulcrum parts, first shaft detaching grooves which are provided adjacently to the first communicating grooves, have shapes corresponding to detachment moving traces which are different from installing moving traces when the fitting lever is pivotably installed to the first connector housing, and make the lever supporting shafts, which are located at the pivoting fulcrum parts, escape to the outside of the lever bodies with the movement of the fitting lever along the detachment moving traces, and second shaft detaching grooves which are provided adjacently to the second communicating grooves, have shapes corresponding to the detachment moving traces, and make the action receiving shafts, which are located at the action receiving parts, escape to the outside of the lever bodies with the movement of the fitting lever along the detachment moving traces.

2. The lever connector according to claim 1, wherein the lever bodies include tracking protrusions on the inner surfaces, and the outer surfaces of the pair of side walls of the second connector housing which are opposed to the inner surfaces of the lever bodies include:

first movement regulating surfaces which regulate the movement direction of the lever bodies so that when the fitting lever is inserted and installed to the second connector housing, the tracking protrusions abut against the first movement regulating surfaces to make the lever supporting shafts arrive at the pivoting fulcrum parts, and second movement regulating surfaces which are formed so that the tracking protrusions are slidable on the second movement regulating surfaces while the pivoting operation of the fitting lever to make the connector housings to be fitted and connected with each other is completed, and regulate the movement courses of the lever bodies to courses corresponding to the detachment moving traces when an operation of detaching the fitting lever is performed while the tracking protrusions contact the second movement regulating surfaces.

3. The lever connector according to claim 2, wherein the outer surfaces of the pair of side walls of the second connector housing, which are opposed to the inner surfaces of the lever bodies, include third movement regulating surfaces on which the tracking protrusions are slidable when the fitting lever is pivoted to make the connector housings to be fitted and connected with each other, and against which the tracking protrusions abut to regulate the lever bodies from moving to a detaching direction.

4. A lever connector comprising:

a first connector housing;

a second connector housing which is fitted and connected with the first connector housing; and a fitting lever which is pivotably installed to the first connector housing as a lever member to reduce the operating force to fit and detach the first connector housing with and from the second connector housing, wherein the first connector housing includes lever supporting shafts which are respectively protruded from a pair of outer surfaces thereof, the second connector housing includes:

an outer sheath wall part which receives an outer periphery of the first connector housing, shaft guiding slots formed in a pair of opposed side walls of the outer sheath wall part along a fitting direction of the connector housings, and in which, when the connector housings are fitted with each other, the lever supporting shafts are fitted movably along the fitting direction of the connector housings; and action receiving shafts which are protruded from the opposed side walls, at a predetermined distance from the shaft guiding slots in a direction perpendicular to the fitting direction, the fitting lever includes:

a pair of opposed lever bodies which sandwich the pair of side walls of the second connector housing; and a force point part connecting the lever bodies which receives an operating force to make the pair of lever bodies pivot around the action receiving shafts, and the lever bodies include:

first shaft introducing grooves which are formed to open at lower edges of the lever bodies, and which receive the lever supporting shafts, in first initial engaged positions when the lever bodies are inserted and installed to the pair of side walls in an initial inclined state;

second shaft introducing grooves which are formed to open at lower edges of the lever bodies, and which receive the action receiving shafts in second initial engaged positions when the lever bodies are inserted and installed to the pair of side walls in the initial inclined state, pivoting fulcrum parts formed at upper ends of the first shaft introducing grooves and extending in a first direction substantially away from the second shaft introducing grooves, and with which the lever supporting shafts are pivotably engaged when the fitting lever is moved in a second direction, opposite the first direction, to a pivoting start position, first communicating grooves formed at upper ends of the first shaft introducing grooves and extending substantially in the second direction, action receiving parts formed at upper ends of the second shaft introducing grooves and extending substantially in the first direction, and with which the action receiving shafts are pivotably engaged when the fitting lever is moved in the second direction to the pivoting start position, second communicating grooves formed at upper ends of the second shaft introducing grooves and extending in substantially the second direction, first shaft detaching grooves formed to open at lower edges of the lever bodies adjacent the first shaft introducing grooves, and extending to the first communicating grooves, and second shaft detaching grooves formed to open at an end side of the lever bodies adjacent the second shaft introducing grooves, and extending to the second communicating grooves, wherein the fitting lever is movable from the pivoting start position to a fitted position, such that the lever supporting shafts of the first connector housing are moved within the shaft guiding slots in the fitting direction to fully connect the first and second connector housings, and wherein the fitting lever is removed from the housings by moving the fitting lever in the first direction so as to align the lever supporting shafts and the action receiving shafts with the first shaft detaching grooves and the second shaft detaching grooves, respectively, and thereafter moving the fitting lever such that the lever supporting shafts move outwardly through the first shaft detaching grooves and the action receiving shafts move outwardly through the second shaft detaching grooves.

5. The lever connector according to claim 4, wherein the lever bodies include tracking protrusions on inner surfaces thereof, and the pair of side walls of the second connector housing include:

first movement regulating surfaces which regulate the movement of the lever bodies so that when the fitting lever is inserted and installed to the second connector housing, the tracking protrusions abut against the first movement regulating surfaces to make the lever supporting shafts arrive at the pivoting fulcrum parts, and second movement regulating surfaces which are formed so that the tracking protrusions are slidable thereon while the pivoting operation of the fitting lever to make the connector housings to be fitted and connected with each other is completed, and regulate the movement courses of the lever bodies to courses corresponding to the detachment of the fitting lever.

6. The lever connector according to claim 5, wherein the pair of side walls of the second connector housing include third movement regulating surfaces on which the tracking protrusions are slidable when the fitting lever is pivoted to make the connector housings connected with each other, and against which the tracking protrusions abut to regulate the lever bodies from moving to a detaching direction.

* * * * *